Patented Mar. 12, 1940

2,193,337

UNITED STATES PATENT OFFICE 2,193,337

CATALYTIC OXIDATION OF CARBONIFEROUS MATERIALS

Fred Davison Leicester, St. Helens, England, assignor to Imperial Chemical Industries Limited, a corporation of Great Britain No Drawing. Application February 23, 1938, Serial No. 192,165

8 Claims. (Cl. 260—538)

This invention relates to improvements in the manufacture of organic acids and their salts, and more particularly to the manufacture of oxalic acid and oxalates.

It is well known that oxalic and similar organic acids can be prepared from wood fibre, peat, coal and the like by oxidation with nitric acid or nitric oxides. It has also been proposed to prepare acetic acid and oxalic acid by treating cellulosic materials with a hot alkaline solution, and then with an oxidising agent, e. g. wood chips were exposed to a caustic alkali solution while a current of air at 105° to 110° C. was passed through the solution for several hours. Another proposal is to prepare alkaline or alkaline earth salts of oxalic acid and saturated monobasic fatty acids by heating carbohydrates with air and a solution of an oxide or hydroxide of an alkali metal or an alkaline earth metal in the presence of a heavy hydrocarbon as catalyst. It has also been proposed to treat sawdust with lime in the presence of oxygen.

The above methods have not proved entirely satisfactory, being either expensive to operate or resulting in very poor yields.

This invention has as an object to devise a new method of manufacturing oxalic and other organic acids. A further object is to devise a method of manufacturing oxalic acid which will give good yields and will be economical and easy to operate. A further object is to devise a method whereby oxalic acid can be manufactured from coal. Further objects will appear hereinafter.

These objects are accomplished by the following invention. I have found that salts of oxalic acid can be obtained with an improved yield and by an economical process, together with lesser amounts of salts of other organic acids by heating carbonaceous materials such as sawdust, wood chips, peat, or coal, with oxygen-containing gases at elevated pressures and temperatures in the presence of at least 10 times the weight of carbonaceous material of water and preferably an oxide or hydroxide of an alkali or alkaline earth metal. The oxalic acid, and also if desired the other organic acids formed such as mellitic acid, benzoic acid or acetic acid may then be isolated from the resulting reaction mixture in which they are present as salts of the alkali or alkaline earth metal used to effect the decomposition of the original carbonaceous material, by the usual methods, e. g. by acidifying the liquor with sulphuric acid, filtering, and evaporating the filtrate until oxalic acid crystallises out on cooling it. When using an alkaline earth hydroxide the oxalic acid will, of course, be present as an insoluble salt, and if desired the oxalic acid may be obtained from the reaction mixture by filtering off the solid material and extracting the oxalic acid therefrom with dilute hydrochloric or sulphuric acid. The mellitic acid and like acids can be isolated from the filtrate by acidifying, warming, and filtering the warmed liquid, while the acetic acid can be recovered from residual liquid by steam distillation. If desired other oxidising agents such as potassium permanganate or vanadium pentoxide may be present during the reaction.

The following examples are illustrative of my invention, all parts being by weight:

Example 1

A steel autoclave, fitted with a stirring device was charged with 100 parts of sawdust, 2,000 parts of water and 150 parts of quick-lime, heated to 180° C. and oxygen forced in and maintained at a pressure of 20 atmospheres for two hours. The oxygen supply was cut off, the vessel allowed to cool below 100° C. and the contents discharged into another vessel. Sulphuric acid was then added until the liquor contained about 5% by weight of free sulphuric acid, the liquor warmed to 60–70° C. and then filtered. The filtrate contained 22.5 parts of oxalic acid.

Example 2

100 parts of sawdust were treated as in Example 1 for four hours. The resultant liquor contained 45 parts of oxalic acid as calcium oxalate.

Example 3

100 parts of powdered coal (Bolsover Clipstone) were heated at 185° C. in a stirred autoclave for thirteen hours with 2,000 parts of 5N caustic soda in the presence of oxygen maintained at 20 atmospheres pressure and the liquor then allowed to cool. The solid residue, comprising 5% of the original coal was filtered off, the filtrate acidified with hydrochloric acid until the pH was less than 2 and then heated to 60° C. The humic acids thereby precipitated were filtered off and dried. The volatile acids (chiefly acetic acid) were isolated by steam distillation and oxalic acid was recovered from the residual liquor by neutralising, adding calcium chloride, and working up the precipitate in known manner. Aromatic acids present were obtained by evaporating to dryness the liquor from which the oxalic acid had been removed as calcium oxalate, acidifying and extracting with acetone. The following acids were thus obtained:

| | Parts |
|---|---|
| Volatile acids (as acetic acid | 10.5 |
| Humic acid | 13.0 |
| Oxalic acid | 26.6 |
| Aromatic acids | 32.2 |

*Example 4*

100 parts of powdered coal (Bolsover Clipstone) were heated as in Example 3 for ten hours in the presence of 1,500 parts of 5N caustic soda and 10 parts of potassium permanganate. It was found that 77% of the coal had decomposed, while the liquor was worked up as in the previous example to give the following acids:

| | Parts |
|---|---|
| Volatile acids (as acetic acid) | 11.3 |
| Humic acid | 32.0 |
| Oxalic acid | 14.3 |
| Aromatic acids | 18.3 |

A suitable pressure at which to perform the oxidation treatment is 20 atmospheres of oxygen, though this value is not a critical one, and considerable latitude is possible in the choice of the working pressure, with corresponding variation in the time for which treatment must be continued, and in the temperature to which the reaction vessel is heated. It is difficult to operate the reaction at a pressure of less than 12 atmospheres of oxygen while when using air pressures of 80 atmospheres I was faced with mechanical difficulties which prevented satisfactory working. With better apparatus it may be useful to go to higher pressures. Below 160° C. the reaction is extremely slow, while above 200° C. practically no oxalic acid is formed. With a pressure of 20 atmospheres of oxygen, good yields are obtained by heating to about 180° C. for times varying between 2 and 20 hours, depending on the material and the alkaline reagent used. With sawdust, for example, I prefer to use lime, and then two to twelve hours are sufficient under the conditions of temperature and pressure indicated above, while for a bituminous coal as much as twenty hours may be required to obtain satisfactory yields.

With regard to the proportion of raw materials when using sawdust and lime, the maximum yield is obtained when the ratio of lime to sawdust is 1.4:1. Larger ratios do not increase the yield while smaller ratios give smaller yield. In the treatment of coal I find that amounts of alkaline material corresponding to a normal or 5 normal solution give satisfactory results. I have found that the process is difficult to operate unless there are present at least 10 parts of water to one part of the carbonaceous material. As the amount of water is increased beyond this the rate of reaction slows down considerably, becoming uneconomically slow when as much as 20 parts of water are used per part of sawdust. When working with the other conditions at optimum, i. e. with sawdust and lime in the proportion 1:1.4, at 20 atmospheres of oxygen and 180° C., and with 10 times as much water than sawdust, 3 to 4 hours are required, for the reaction to be complete. In the presence of a trace of potassium permanganate or other catalyst (e. g. $V_2O_5$) only 1 to 2 hours are required, but the disadvantage is introduced that the product is contaminated with the catalyst.

As many apparently widely different embodiments of this invention may be made without departing from the spirit and scope thereof it is to be understood that I do not limit myself to the specific embodiments thereof except as defined in the appended claims.

I claim:

1. A method of manufacturing oxalic and other acids which comprises heating at superatmospheric pressure carboniferous material together with at least 10 times its weight of water and an added oxygen-containing gas, in the presence of a substance, in an amount greater than the weight of the carboniferous material, of the class which consists of the oxides and hydroxides of the alkali and alkaline earth metals.

2. A method of manufacturing oxalic acid and other acids which comprises heating at superatmospheric pressure carboniferous material together with at least 10 times its weight of water and an added oxygen-containing gas in the presence of an amount of lime greater than the weight of the carboniferous material.

3. A method as claimed in claim 1 in which the carboniferous material is sawdust.

4. A method as claimed in claim 1 carried out at temperatures between 170 and 190° C.

5. A method as claimed in claim 1 in which the weight of water is at least 10 times and not more than 20 times the weight of the carboniferous material present.

6. A method as claimed in claim 1 in which the partial pressure of the oxygen present lies between 12 and 15 atmospheres.

7. A method as claimed in claim 1 in which there is also present a catalyst.

8. A method as claimed in claim 1 in which there is also present as catalyst potassium permanganate.

FRED DAVISON LEICESTER.